US011758976B2

(12) United States Patent
Case et al.

(10) Patent No.: US 11,758,976 B2
(45) Date of Patent: *Sep. 19, 2023

(54) MIDSOLE WITH GRADED RESPONSE

(71) Applicant: NIKE, Inc., Beaverton, OR (US)

(72) Inventors: Patrick Case, Portland, OR (US); Zachary M. Elder, Portland, OR (US); Lee D. Peyton, Tigard, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/579,688

(22) Filed: Jan. 20, 2022

(65) Prior Publication Data

US 2022/0132986 A1   May 5, 2022

Related U.S. Application Data

(63) Continuation of application No. 16/720,283, filed on Dec. 19, 2019, now Pat. No. 11,259,595, which is a
(Continued)

(51) Int. Cl.
*A43B 13/20* (2006.01)
*A43B 3/00* (2022.01)
(Continued)

(52) U.S. Cl.
CPC ............ *A43B 13/20* (2013.01); *A43B 1/0009* (2013.01); *A43B 3/0052* (2013.01); *A43B 3/0068* (2013.01); *A43B 5/00* (2013.01); *A43B 13/023* (2013.01); *A43B 13/04* (2013.01); *A43B 13/125* (2013.01); *A43B 13/127* (2013.01); *A43B 13/186* (2013.01); *A43B 13/206* (2013.01);
(Continued)

(58) Field of Classification Search
CPC ..... A43B 13/20; A43B 13/206; A43B 13/023; A43B 17/03
USPC .......................................................... 36/29
See application file for complete search history.

(56) References Cited

U.S. PATENT DOCUMENTS 2,677,906 A * 5/1954 Reed ...................... A43B 17/03
36/153
2,762,134 A * 9/1956 Town ..................... A43B 17/03
36/153
(Continued)

FOREIGN PATENT DOCUMENTS

CN          1133149 A     10/1996
KR       100741628 B1      7/2007

*Primary Examiner* — Marie D Bays
(74) *Attorney, Agent, or Firm* — Quinn IP Law

(57) ABSTRACT

A sole structure for an article of footwear comprises a midsole having four stacked polymeric sheets bonded to one another to define a first cushioning layer, a second cushioning layer, and a third cushioning layer. Each cushioning layer comprises a sealed chamber retaining gas in isolation from each other sealed chamber. Bonds between adjacent ones of the sheets are arranged such that the third cushioning layer is stacked directly above the first cushioning layer with the second cushioning layer bordering both the first cushioning layer and the third cushioning layer, and the sealed chamber of the second cushioning layer includes a plurality of elongated segments each extending lengthwise across a longitudinal midline of the midsole at a respective acute angle to the longitudinal midline.

16 Claims, 5 Drawing Sheets

Related U.S. Application Data continuation of application No. 15/983,548, filed on May 18, 2018, now Pat. No. 10,537,153.

(60) Provisional application No. 62/510,003, filed on May 23, 2017.

(51) Int. Cl.

| | | |
|---|---|---|
| *A43B 13/18* | (2006.01) | |
| *A43B 13/04* | (2006.01) | |
| *A43B 13/02* | (2022.01) | |
| *A43B 5/00* | (2022.01) | |
| *B32B 3/12* | (2006.01) | |
| *B32B 27/40* | (2006.01) | |
| *B32B 27/30* | (2006.01) | |
| *B32B 27/08* | (2006.01) | |
| *A43B 1/00* | (2006.01) | |
| *B32B 7/05* | (2019.01) | |
| *A43B 13/22* | (2006.01) | |
| *A43B 13/12* | (2006.01) | |
| *B32B 7/022* | (2019.01) | |
| *B32B 7/02* | (2019.01) | |

(52) U.S. Cl.
CPC .............. *A43B 13/223* (2013.01); *B32B 3/12* (2013.01); *B32B 7/02* (2013.01); *B32B 7/022* (2019.01); *B32B 7/05* (2019.01); *B32B 27/08* (2013.01); *B32B 27/306* (2013.01); *B32B 27/40* (2013.01); *B32B 2307/7242* (2013.01); *B32B 2437/02* (2013.01)

(56) References Cited

U.S. PATENT DOCUMENTS

| | | | |
|---|---|---|---|
| 3,300,880 A | 1/1967 | Campagna | |
| 3,469,576 A * | 9/1969 | Everts | A43B 17/03 36/154 |
| 4,063,371 A | 12/1977 | Batra | |
| 4,547,919 A * | 10/1985 | Wang | B63B 7/08 428/116 |
| 4,999,931 A * | 3/1991 | Vermeulen | A43B 13/185 36/153 |
| 5,533,280 A | 7/1996 | Halliday | |
| 5,987,780 A | 11/1999 | Lyden et al. | |
| 6,006,448 A * | 12/1999 | Hellman | A43B 17/03 36/8.1 |
| 6,402,879 B1 * | 6/2002 | Tawney | A43B 13/20 36/35 R |
| 6,510,624 B1 * | 1/2003 | Lakic | A43B 17/035 36/28 |
| 6,976,321 B1 * | 12/2005 | Lakic | A43B 17/006 36/28 |
| 7,451,555 B1 * | 11/2008 | Lakic | A43B 13/206 36/43 |
| 8,125,796 B2 * | 2/2012 | Ellis | H05K 9/0049 361/679.01 |
| 9,510,646 B2 * | 12/2016 | Holt | A43B 13/04 |
| 9,603,415 B2 * | 3/2017 | Taylor | A43B 13/189 |
| 10,537,153 B2 * | 1/2020 | Case | A43B 13/127 |
| 11,259,595 B2 * | 3/2022 | Case | B32B 27/08 |
| 2001/0042321 A1 * | 11/2001 | Tawney | A43B 13/20 36/43 |
| 2012/0167413 A1 | 7/2012 | Marvin et al. | |
| 2013/0227858 A1 * | 9/2013 | James | A43B 13/125 36/88 |
| 2016/0073732 A1 | 3/2016 | Ernst et al. | |
| 2016/0295967 A1 * | 10/2016 | Campos, II | A43B 13/20 |
| 2018/0070675 A1 * | 3/2018 | Campos, II | B29C 65/48 |
| 2018/0338575 A1 * | 11/2018 | Elder | A43B 13/127 |
| 2018/0338577 A1 * | 11/2018 | Elder | B32B 1/00 |

* cited by examiner

MIDSOLE WITH GRADED RESPONSE

CROSS-REFERENCE TO RELATED APPLICATIONS

This application is a continuation of and claims the benefit of priority to U.S. patent application Ser. No. 16/720,283, filed Dec. 19, 2019, which is a continuation of and claims the benefit of priority to U.S. patent application Ser. No. 15/983,548, filed May 18, 2018, now U.S. Pat. No. 10,537,153, issued Jan. 21, 2020, which claims the benefit of priority to U.S. Provisional Application No. 62/510,003 filed May 23, 2017, and each of which is hereby incorporated by reference in its entirety.

TECHNICAL FIELD

The present teachings generally include a sole structure for an article of footwear including a midsole.

BACKGROUND

An article of footwear typically includes a sole structure configured to be located under a wearer's foot to space the foot away from the ground. Sole structures in athletic footwear are typically configured to provide cushioning, motion control, and/or resilience.

BRIEF DESCRIPTION OF THE DRAWINGS

FIG. 1 is a schematic illustration in side view of an embodiment of an article of footwear having a sole structure.

FIG. 2 is a schematic illustration in bottom view of the midsole of the article of footwear of FIG. 1.

DESCRIPTION

Figure 3:
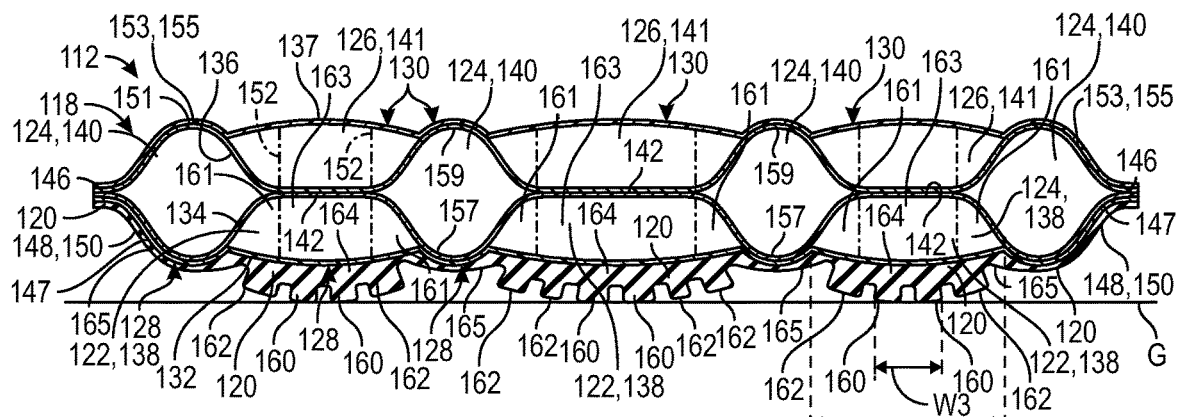
FIG. 3 is a schematic illustration in cross-sectional view of the sole structure of the article of footwear of FIG. 1 taken at lines 3-3 in FIG. 2, including the midsole and an outsole.

An article of footwear includes a sole structure with a midsole that has multiple cushioning layers of sealed chambers containing gas. The cushioning layers may each have a different compressive stiffness, and may be disposed relative to one another such that the midsole absorbs a compressive load, such as a dynamic compressive load due to impact with the ground, in stages of progressive cushioning (referred to as staged or graded cushioning) according to the relative stiffness values of the layers. Underfoot loads are "dosed" or "staged" to the wearer, with each stage having a different effective stiffness. In one example, the midsole initially provides a low, linear rate of change of load to displacement (i.e., compressive stiffness), followed by a higher, possibly nonlinear rate, and then a more rapid, exponentially increasing rate. The sole structure provides the graded cushioning while being lightweight and flexible. Moreover, various embodiments may exhibit an unloading behavior (i.e., behavior when the dynamic compressive force is removed) that provides significant energy return.

The inflation pressures of the respective sealed chambers of the cushioning layers may be selected to provide various sequences of load absorption by the cushioning layers, affecting the feel or "ride" of the sole structure. The inflation pressures affect the stiffness of the cushioning layers, with a higher inflation pressure resulting in a greater stiffness. In one example embodiment, the first cushioning layer has a first stiffness, the second cushioning layer has a second stiffness greater than the first stiffness, and the third cushioning layer has a third stiffness. A dynamic compressive load on the sole structure is absorbed by the first cushioning layer, the second cushioning layer, and the third cushioning layer in a sequence according to relative magnitudes of the first stiffness, the second stiffness, and the third stiffness. As used herein, "stiffness" is the rate of change of load to displacement in compression of a cushioning layer. A cushioning layer may have a constant stiffness (i.e., linear rate of change of load to displacement), a nonlinear stiffness, such as an exponentially increasing rate of change of load to displacement in compression, or may have a rate that is initially linear and changes to nonlinear or vice versa. The stiffness of the midsole may have an effective stiffness in a portion of the displacement range that is based on the stiffness values of more than one of the cushioning layers when two or more of the cushioning layers compress in series or in parallel.

Each sealed chamber retains a gas (e.g., air, nitrogen, or another gas) at a predetermined pressure when in an unloaded state, such as at a specific inflation pressure or at ambient pressure. For example, such a sealed chamber may be defined by and bounded by two adjacent polymeric sheets that are impervious to the gas. A gas-filled sealed chamber is empty (i.e., "structure-less"), yet can provide cushioning when compressed, with significant weight reduction in comparison to most foam. As used herein, a "predetermined pressure" is at a predetermined reference temperature.

More specifically, a sole structure for an article of footwear comprises a midsole having four stacked polymeric sheets bonded to one another to define a first cushioning layer, a second cushioning layer, and a third cushioning layer, each cushioning layer comprising a sealed chamber retaining gas in isolation from each other sealed chamber. For example, the four stacked polymeric sheets may include a first sheet at a ground-facing surface of the midsole, a second sheet stacked on the first sheet, a third sheet stacked on the second sheet, and a fourth sheet stacked on the third sheet at a foot-facing surface of the midsole. Bonds between adjacent ones of the sheets are arranged such that the third cushioning layer is stacked directly above the first cushioning layer with the second cushioning layer bordering both the first cushioning layer and the third cushioning layer. The sealed chamber of the second cushioning layer includes a plurality of elongated segments each extending lengthwise across a longitudinal midline of the midsole at a respective acute angle to the longitudinal midline. The elongated segments are sub-chambers of the sealed chamber of the second cushioning layer. They may be tubular in shape, and are also referred to herein as tubular sub-chambers. By extending over the longitudinal midline, especially where the elongated segments extend a substantial portion of the width of the midsole, such as from the lateral extremity to the medial extremity, the elongated segments provide torsional rigidity to the midsole. By extending at an acute angle to the longitudinal midline, the elongated segments encourage flexing in desired locations and directions, as described herein.

In one or more embodiments, the elongated segments may include a first elongated segment that angles forward in a direction from a lateral edge of the midsole to a medial edge of the midsole, and a second elongated segment that angles forward in a direction from the medial edge to the lateral edge and intersects the first elongated segment. The first and second elongated segments establish flexion axes about which the midsole flexes.

For example, in one aspect, the first elongated segment and the second elongated segment may together define an X shape in a forefoot region of the midsole. Moreover, the bonds between the second sheet and the third sheet may include a plurality of V-shaped bonds in the forefoot region that border the first elongated segment and the second elongated segment. The V-shaped bonds help to define the X shape of the elongated segments.

In another aspect, the first elongated segment and the second elongated segment together define an X shape in a heel region of the midsole. In such an embodiment, the bonds between the second sheet and the third sheet may include a plurality of V-shaped bonds in the heel region that border the first elongated segment and the second elongated segment.

In still another aspect, the bonds between the second sheet and the third sheet include a plurality of elongated bonds in the midfoot region that angle forward over the longitudinal midline from a lateral edge of the midsole to a medial edge of the midsole. In other embodiments, the bonds between the second sheet and the third sheet include a plurality of V-shaped bonds in the midfoot region that border at least one of the elongated segments in the midfoot region such that said at least one of the elongated segments in the midfoot region is V-shaped.

The first cushioning layer and the second cushioning layer may be adjacent to a ground-facing surface of the midsole, and the sole structure may also include an outsole secured to the ground-facing surface. The midsole and the outsole are configured in a complementary manner so that the outsole provides increasing ground contact area as the cushioning layers compress. For example, the outsole may be thicker under the first cushioning layer than under the second cushioning layer. The thicker portions of the outsole under the first cushioning layer protrude further from the midsole than thinner portions of the outsole under the second cushioning layer under a first compressive load, and are level with the thinner portions under a greater, second compressive load. The ground contact area of the outsole is thus greater under the larger loads, providing greater load distribution and traction.

The outsole may include lugs disposed directly under the first cushioning layer. The lugs are narrower than corresponding portions of the first cushioning layer disposed directly there above. A sufficient compressive load applied to the midsole can thus compress the first cushioning layer around the lugs so that the lugs are nested in the midsole below the first cushioning layer. In some embodiments, the lugs include central lugs and side lugs. The central lugs are centrally-disposed under corresponding portions of the first cushioning layer and the side lugs are disposed adjacent to the central lugs. Under a first compressive load, such as a relatively low load or no load, the ground-facing surface of the midsole is rounded under the first cushioning layer such that the central lugs are lower than the side lugs. Under a second compressive load greater than the first load, the first cushioning layer compresses, moving the side lugs level with the central lugs, thereby increasing ground contact area of the outsole. Accordingly, a dynamic compressive load as may occur with running or jumping increases the ground contact area of the outsole.

The bonds between adjacent sheets of the four stacked polymeric sheets may be arranged so that the second cushioning layer directly overlies only a first portion of the first cushioning layer, and the third cushioning layer directly overlies only a remaining portion of the first cushioning layer. The first cushioning layer thus absorbs the dynamic compressive load in series with the second cushioning layer at the first portion of the first cushioning layer, and the first cushioning layer absorbs the dynamic compressive load in parallel with the second cushioning layer and in series with the third cushioning layer at the remaining portion of the first cushioning layer.

The bonds may also be arranged so that the first cushioning layer and the second cushioning are disposed adjacent to a ground-facing surface of the midsole, and the third cushioning layer is displaced from the ground-facing surface of the midsole by the first cushioning layer and the second cushioning layer. The second cushioning layer and the third cushioning layer thus define a foot-facing surface of the midsole, and the first cushioning layer is displaced from the foot-facing surface of the midsole by the second cushioning layer and the third cushioning layer.

A sole structure for an article of footwear comprises a midsole having four stacked polymeric sheets bonded to one another to define a first sealed chamber bounded by the first polymeric sheet and the second polymeric sheet, a second sealed chamber bounded by the second polymeric sheet and the third polymeric sheet, and a third sealed chamber bounded by the third polymeric sheet and the fourth polymeric sheet. The second polymeric sheet and the third polymeric sheet are bonded to one another between the first sealed chamber and the third sealed chamber at bonds at least some of which have an outer periphery with a closed shape. The second sealed chamber borders the outer periphery. The first sealed chamber and the second sealed chamber are disposed adjacent to a ground-facing surface of the midsole. An outsole is secured to the ground-facing surface of the midsole. The outsole has relatively thick portions under the first sealed chamber and relatively thin portions under the second sealed chamber such that, under a first compressive load, only the relatively thick portions form a ground contact surface, and under a second compressive load greater than the first compressive load, the first sealed chamber compresses such that both the relatively thick portions and the relatively thin portions form the ground contact surface.

In an embodiment, the outsole includes lugs disposed directly under the first sealed chamber. The lugs are narrower than corresponding portions of the first sealed chamber disposed directly there above such that the first sealed chamber compresses around the lugs under the second compressive load. The first sealed chamber and the second sealed chamber include a plurality of tubular sub-chambers extending lengthwise at least partially transversely across the midsole at the ground-facing surface.

In an embodiment, a first of the tubular sub-chambers of the second sealed chamber extends at a first acute angle to a longitudinal midline of the midsole from a medial edge of the midsole to a lateral edge of the midsole uninterrupted by the first sealed chamber and the third sealed chamber, establishing a first flexion axis about which the midsole flexes. A second of the tubular sub-chambers of the second sealed chamber extends at a second acute angle to the longitudinal midline of the midsole from the medial edge of the midsole to the lateral edge of the midsole uninterrupted by the first sealed chamber and the third sealed chamber, establishing a second flexion axis about which the midsole flexes. The first flexion axis and the second flexion axis intersect in a forefoot region of the midsole. The midsole will tend to flex at the flexion axes when pivoting movement about a planted forefoot is desired. In the same or a different embodiment, similar first and second flexion axes may be provided in the heel region. In some embodiments, the tubular sub-chambers extend across a longitudinal midline of the midsole substantially from a lateral edge of the midsole to a medial edge of the midsole in a midfoot region of the midsole, providing torsional rigidity in the midfoot region.

In an embodiment with four polymeric sheets, the second polymeric sheet and the third polymeric sheet tether the first polymeric sheet to the fourth polymeric sheet via the webbing. Stated differently, the first and second polymeric sheets together extend from an inner surface of the first polymeric sheet to an inner surface of the fourth polymeric sheet and thereby limit the height of the midsole from the first polymeric sheet to the fourth polymeric sheet.

In various embodiments, the first sealed chamber is inflated to a first predetermined pressure, the second sealed chamber is inflated to a second predetermined pressure, and the third sealed chamber is inflated to a third predetermined pressure. The third predetermined pressure can be lower than the second predetermined pressure, the same as the second predetermined pressure, lower than the first predetermined pressure, or higher than the first predetermined pressure. In one embodiment, the third predetermined pressure is lower than both the first and the second predetermined pressure. Because the third cushioning layer is nearer to a foot-facing outer surface of the midsole than the first cushioning layer, such an embodiment can provide a soft underfoot feel. In another embodiment, the third predetermined pressure is less than the second predetermined pressure, and higher than the first predetermined pressure. Both embodiments sandwich at least a large portion of the second sealed chamber between the first and second sealed chambers, isolating the second sealed chamber of the stiffer second cushioning layer from the foot-facing and ground-facing outer surface of the midsole.

In an embodiment, the first polymeric sheet and the second polymeric sheet are bonded to one another along an outer peripheral portion of an underside of the second sealed chamber such that the first sealed chamber underlies the second sealed chamber only inward of the outer peripheral portion of the underside of the second sealed chamber. Additionally, the third polymeric sheet and the fourth polymeric sheet are bonded to one another along an outer peripheral portion of a top side of the second sealed chamber such that the third sealed chamber overlies the second sealed chamber only inward of the outer peripheral portion of the top side of the second sealed chamber. In such an embodiment, the outer periphery of the midsole is of a two-sheet thickness at these outer peripheral portions of the underside and the top side, which prevents a ballooning tendency of a thinner, single sheet thickness. An outer peripheral flange has a four-sheet thickness.

Accordingly, the first and the third cushioning layers are disposed in series with one another and in parallel with the second cushioning layer. If the second sealed chamber has the highest pressure of the three sealed chambers in the unloaded state, it stabilizes the midsole around the stacked, less stiff, first and third chambers.

The above features and advantages and other features and advantages of the present teachings are readily apparent from the following detailed description of the modes for carrying out the present teachings when taken in connection with the accompanying drawings.

Figures 1, 2:
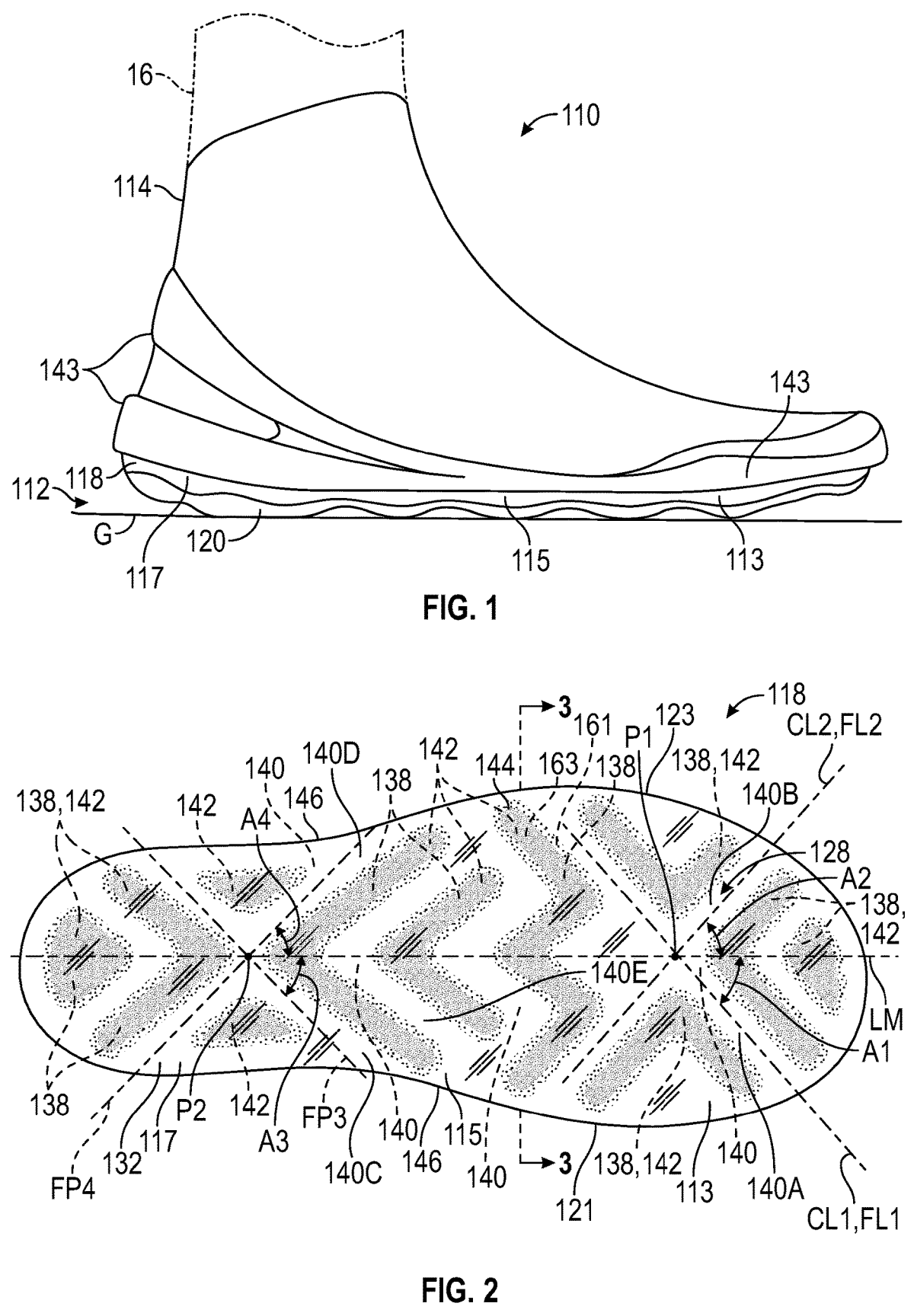

Referring to the drawings wherein like reference numbers refer to like components throughout the views, FIGS. 1-6 show an embodiment of an article of footwear 110 that has a sole structure 112 with a midsole 118 within the scope of the present teachings. The midsole 118 has first, second, and third cushioning layers 122, 124, 126, as best shown in FIGS. 3-6. At least some of the multiple cushioning layers 122, 124, 126 have a different stiffness. The multiple cushioning layers 122, 124, 126 are disposed relative to one another such that the midsole 118 absorbs a dynamic compressive load (such as due to impact with the ground) in stages of progressive cushioning in a sequence according to the relative stiffness of the cushioning layers. None of the cushioning layers 122, 124, 126 are foam. As used herein, "stiffness" of a cushioning layer is the ratio of change in compressive load (e.g., force in Newtons) to displacement of the cushioning layer (e.g., displacement in millimeters along the axis of the compressive load).

The midsole 118 includes four stacked polymeric sheets: a first polymeric sheet 132, a second polymeric sheet 134, a third polymeric sheet 136, and a fourth polymeric sheet 137. The sheets are bonded to one another to define a first cushioning layer 122, a second cushioning layer 124, and a third cushioning layer 126. The first cushioning layer 122 is formed by the first and second polymeric sheets 132, 134, which form and define a first sealed chamber 138 bounded by the first polymeric sheet 132 and the second polymeric sheet 134. The second polymeric sheet 134 and the third polymeric sheet 136 form and define a second sealed chamber 140 bounded by the second polymeric sheet 134 and the third polymeric sheet 136. The third cushioning layer 126 includes a third sealed chamber 141 that is formed, defined, and bounded by the third polymeric sheet 136 and the fourth polymeric sheet 137. The first, second, third, and fourth polymeric sheets 132, 134, 136, and 137 are a material that is impervious to gas, such as air, nitrogen, or another gas. This enables the first sealed chamber 138 to retain a gas at a first predetermined pressure, the second sealed chamber 140 to retain a gas at a second predetermined pressure, and the third sealed chamber 141 to retain a gas at a third predetermined pressure.

FIG. 2 is a bottom view of the midsole 118, with an outsole 120 removed. As is apparent in FIGS. 1 and 2, the midsole 118 is a full length, unitary midsole that includes a forefoot region 113, a midfoot region 115, and a heel region 117.

The first and third sealed chambers 138, 141 have the shape in plan view substantially the same as the various closed shapes shown in FIG. 2 (e.g., the V shapes, the W shape, and the rounded triangular shapes). The second sealed chamber 140 has the shape of the remaining area in FIG. 2 (i.e., the area surrounding the peripheries of each of the closed shapes in FIG. 2 and extending to the periphery of the midsole 118).

Optionally, a foam or hard polymer support 143 shown in FIG. 1 forms a side wall that surrounds an outer periphery of the midsole 118 and extends up and around the heel region 117 of the upper 114. A foot-facing outer surface 130 of the fourth polymeric sheet 137 (shown in FIG. 3) may secure directly to a lower surface of the upper 114, or to a strobel under the upper 114, or the support 143 may extend under the foot and overlay the foot-facing outer surface 130, with the fourth polymeric sheet 137 secured to the support 143.

With reference to FIG. 3, the four polymeric sheets 132, 134, 136, 137 are stacked so that the second cushioning layer 124 partially overlies the first cushioning layer 122, and the third cushioning layer 126 directly overlies a portion of the first cushioning layer 122 and partially overlies the second cushioning layer 124 when the article of footwear 110 is worn on the foot 16. Accordingly, the sole structure 112 is disposed with the third cushioning layer 126 nearest the foot 16 and the first cushioning layer 122 nearest the ground surface G, such as when the outsole 120 is in contact with the ground surface G. The first cushioning layer 122 and the second cushioning layer 124 define the ground-facing outer surface 128 of the midsole 118. Only the first polymeric sheet 132 is at the ground-facing outer surface 128, but the contours of the ground-facing surface 128 are defined by the first sealed chamber 138 and the second sealed chamber 140. The third cushioning layer 126 is entirely displaced from the ground-facing outer surface 128 by the first cushioning layer 122 and the second cushioning layer 124. The second cushioning layer 124 and the third cushioning layer 126 together define the foot-facing outer surface 130 of the midsole 118. Only the fourth polymeric sheet 137 is at the foot-facing outer surface 130, but the contours of the foot-facing outer surface 130 are defined by the second sealed chamber 140 and the third sealed chamber 141. The first cushioning layer 122 is entirely displaced from the foot-facing outer surface 130 by the second cushioning layer 124 and the third cushioning layer 126.

The first, second, third, and fourth polymeric sheets 132, 134, 136, and 137 can be formed from a variety of materials including various polymers that can resiliently retain a fluid such as air or another gas. Examples of polymer materials for polymeric sheets 132, 134, 136, and 137 include thermoplastic urethane, polyurethane, polyester, polyester polyurethane, and polyether polyurethane. Moreover, the polymeric sheets 132, 134, 136, and 137 can each be formed of layers of different materials. In one embodiment, each polymeric sheet 132, 134, 136, and 137 is formed from thin films having one or more thermoplastic polyurethane layers with one or more barriers layer of a copolymer of ethylene and vinyl alcohol (EVOH) that is impermeable to the pressurized fluid contained therein as disclosed in U.S. Pat. No. 6,082,025, which is incorporated by reference in its entirety. Each polymeric sheet 132, 134, 136, and 137 may also be formed from a material that includes alternating layers of thermoplastic polyurethane and ethylene-vinyl alcohol copolymer, as disclosed in U.S. Pat. Nos. 5,713,141 and 5,952,065 to Mitchell et al. which are incorporated by reference in their entireties. Alternatively, the layers may include ethylene-vinyl alcohol copolymer, thermoplastic polyurethane, and a regrind material of the ethylene-vinyl alcohol copolymer and thermoplastic polyurethane.

The polymeric sheets 132, 134, 136, and 137 may also each be a flexible microlayer membrane that includes alternating layers of a gas barrier material and an elastomeric material, as disclosed in U.S. Pat. Nos. 6,082,025 and 6,127,026 to Bonk et al. which are incorporated by reference in their entireties. Additional suitable materials for the polymeric sheets 132, 134, 136, and 137 are disclosed in U.S. Pat. Nos. 4,183,156 and 4,219,945 to Rudy which are incorporated by reference in their entireties. Further suitable materials for the polymeric sheets 132, 134, 136, and 137 include thermoplastic films containing a crystalline material, as disclosed in U.S. Pat. Nos. 4,936,029 and 5,042,176 to Rudy, and polyurethane including a polyester polyol, as disclosed in U.S. Pat. Nos. 6,013,340, 6,203,868, and 6,321,465 to Bonk et al. which are incorporated by reference in their entireties. In selecting materials for the polymeric sheets 132, 134, 136, and 137 engineering properties such as tensile strength, stretch properties, fatigue characteristics, dynamic modulus, and loss tangent can be considered. The thicknesses of polymeric sheets 132, 134, 136, and 137 can be selected to provide these characteristics.

The first, second, and third sealed chambers 138, 140, 141 are not in fluid communication with one another. Stated differently, the first and second sealed chambers 138, 140 are sealed from one another by the second polymeric sheet 134. The second and third sealed chambers 140, 141 are sealed from one another by the third polymeric sheet 136. This allows the first, second, and third sealed chambers 138, 140, 141 to retain gas at pressures that may be different from one another. The first sealed chamber 138 shown in FIG. 3 retains gas at a first predetermined pressure when the midsole 118 is in an unloaded state, the second sealed chamber 140 retains gas at a second predetermined pressure in the unloaded state, and the third sealed chamber 141 retains gas at a third predetermined pressure in the unloaded state. The unloaded state is the state of the midsole 118 when it is not under either steady state or dynamic loading. For example, the unloaded state is the state of the midsole 118 when it is not bearing any loads, such as when it is not on a foot 16. In the embodiment shown, the second predetermined pressure is higher than the first predetermined pressure. The third predetermined pressure can be different than the first predetermined pressure and/or the second predetermined pressure. The lowest one of the predetermined pressures, such as the first predetermined pressure, may be ambient pressure rather than an inflated pressure. In one non-limiting example, the first predetermined pressure is 7 pounds per square inch (psi), the second predetermined pressure is 20 psi, and the third predetermined pressure is greater than 20 psi. The predetermined pressures may be inflation pressures of the gas to which the respective sealed chambers 138, 140, 141 are inflated just prior to finally sealing the chambers. The lowest one of the predetermined pressures, such as the first predetermined pressure, may be ambient pressure rather than an inflated pressure.

The first cushioning layer 122 has a first stiffness K1 that is determined by the properties of the first and second polymeric sheets 132, 134, such as their thicknesses and material, and by the first predetermined pressure in the first sealed chamber 138. The second cushioning layer 124 has a second stiffness K2 that is determined by the properties of the second and third polymeric sheets 134, 136, such as their thicknesses and material, and by the second predetermined pressure in the second sealed chamber 140. The third cushioning layer 126 has a third stiffness K3 that is determined by the properties of the third and fourth polymeric sheets 136, 137, such as their thicknesses and material, and by the third predetermined pressure in the third sealed chamber 141.

Figure 4:
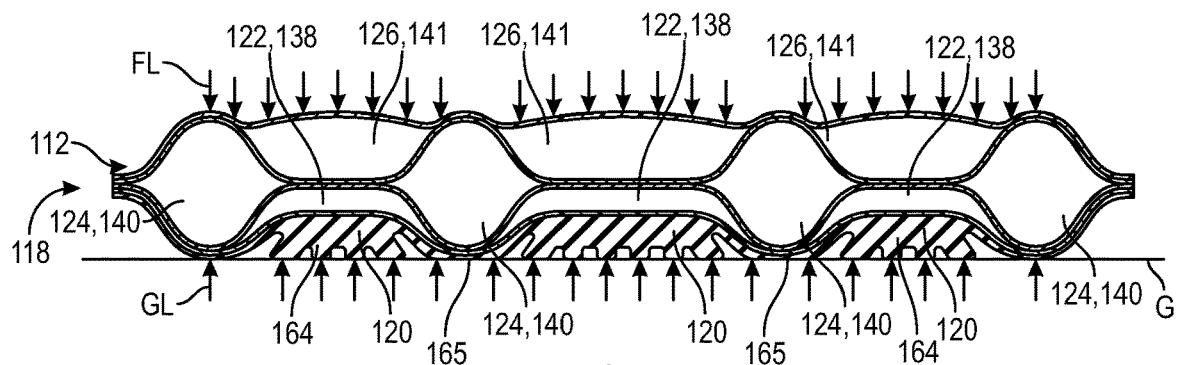
FIG. 4 is a schematic illustration in cross-sectional view of the sole structure of FIG. 3 in a first stage of compression.

A dynamic compressive load on the sole structure 112 due to an impact of the article of footwear 110 with the ground, is indicated in FIG. 4 by a footbed load FL of a person wearing the article of footwear 110 and an opposite ground load GL. The footbed load FL acts on the foot-facing outer surface 130, and the ground load GL acts on a ground contact surface G of the outsole 120, similar to as shown with respect to the corresponding surfaces of the article of footwear 110. The footbed load FL is represented by all of the downward arrows on the foot-facing outer surface 130 in FIG. 3. The ground load GL is represented by all of the upward arrows on the ground contact surface G of the outsole 120 in FIG. 3. The dynamic compressive load is absorbed by the first cushioning layer 122, the second cushioning layer 124, and the third cushioning layer 126 in a sequence according to relative magnitudes of the first stiffness K1, the second stiffness K2, and the third stiffness K3 from least stiff to most stiff. In the embodiment shown, the magnitude of the stiffness of the cushioning layers 122, 124, 126 increases in the following order: first stiffness K1, third stiffness K3, and second stiffness K2, but any combination of relative pressures is possible.

Bonds 142 between adjacent ones of the sheets 132, 134, 136, 137 are arranged such that the third cushioning layer 126 is stacked directly above the first cushioning layer 122 with the second cushioning layer 124 bordering both the first cushioning layer 122 and the third cushioning layer 126. The second polymeric sheet 134 and the third polymeric sheet 136 are bonded to one another between the first sealed chamber 138 and the third sealed chamber 141 at bonds 142 each having an outer periphery 144 with a closed shape. The bonds 142 are also referred to herein as webbing. In the embodiment shown at the cross section of FIG. 3, the closed shape is a zig-zag or "W" shape as best shown in FIG. 2, where the webbing 142 is visible through the transparent and lowest first polymeric sheet 132. Various bonds 142 connecting the second polymeric sheet 134 and the third polymeric sheet 136 are shown in FIG. 2, such as at the portion bounded by the periphery 144. The discrete bonds 142 have various shapes that interfit with one another. The shaded areas surrounding the bonds 142 in FIG. 2 are the outer peripheries of the separate sub-chambers of the first sealed chamber 138 that are disposed above the various bonds 142 in the bottom view of FIG. 3, and are the same as the outer peripheries of the separate sub-chambers of the third sealed chamber 141 disposed below the bonds 142 in the bottom view. The sub-chambers of the first sealed chamber 138 are not in fluid communication with one another. The sub-chambers of the third sealed chamber 141 are not in fluid communication with one another. The second sealed chamber 140 is indicated in FIG. 2 by the entire remaining space surrounding the various discrete bonds 142 in the bottom view of FIG. 2. The sub-chambers of the second sealed chamber 140 are in fluid communication with one another. All four of the first polymeric sheet 132, the second polymeric sheet 134, the third polymeric sheet 136, and the fourth polymeric sheet 137 are bonded to one another at a peripheral flange 146 at an outer periphery of the midsole 118.

An unrestrained portion of the first sealed chamber 138 tends to adopt a rounded shape, also referred to as a domed shape, due to the force of the internal pressure on the inner surfaces of the polymeric sheets 132, 134 bounding the first sealed chamber 138. As shown, each section of the ground-facing outer surface 128 under the first sealed chamber 138 is at least slightly rounded and is substantially centered under the webbing 142. The rounded portions of the ground-facing outer surface 128 are thus also centered under and stabilized by the higher pressure second sealed chamber 140 of the second cushioning layer 124. The second sealed chamber 140 borders and surrounds the outer peripheries 144 of all of the closed shaped bonds 142 between the second and third polymeric sheets 134, 136 shown in FIG. 2, and all surfaces of the first sealed chamber 138 except the domed, ground-facing outer surface 128.

Figure 8:
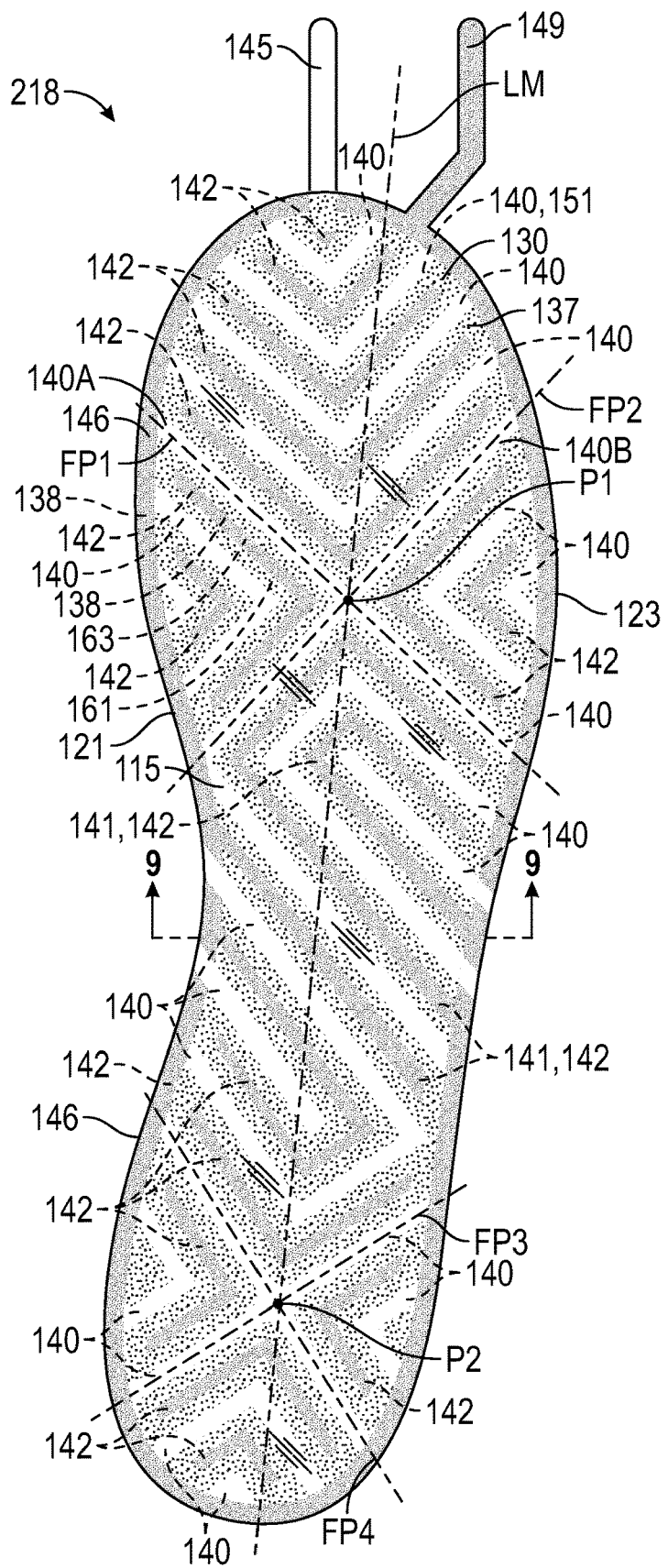
FIG. 8 is a schematic illustration in top view of an alternative embodiment of a midsole of the article of footwear of FIG. 1.

Unlike the second sealed chamber 140, the first sealed chamber 138 is provided as multiple separate sub-chambers (i.e., also referred to as pods) at the separate closed shapes in FIG. 8 not in fluid communication with one another or with the second sealed chamber 140 or third chamber 141. This allows separate, discrete sub-chambers of the first sealed chamber 138 to be optimized in geometry and pressure for various areas of the foot. For example, the sub-chambers of the first sealed chamber 138 can be customized in number, size, location, and fluid pressure for a foot map of pressure loads of a specific wearer, or for a population average of wearers of the particular size of footwear. Alternatively, the sub-chambers of the first sealed chamber 138 could be fluidly connected by channels. The first sealed chamber 138 shown in the cross-section of FIGS. 3-6 is a single one of the various sub-chambers. All portions of the single sub-chambers of the first sealed chamber 138 shown in FIGS. 3-6 are in fluid communication.

The third sealed chamber 141 is also arranged in separate sub-chambers that are not in fluid communication with one another or with the first or second sealed chamber 138, 140 similarly allows the separate, discrete sub-chambers of the third sealed chamber 141 to be optimized for various areas of the foot 16. Alternatively, the sub-chambers of the third sealed chamber 141 could be fluidly connected by channels. The third sealed chamber 141 shown in FIGS. 3-6 is a single one of the sub-chambers, with all portions of the single sub-chamber of the third sealed chamber 141 shown in fluid communication. The second sealed chamber 140 is a single large chamber that surrounds all of the discrete pods of the first sealed chamber 138 and third sealed chamber 141 as described.

The placement of the bonds 142 can be selected to tune (i.e., control) flexibility of the midsole 118. The flexibility (e.g., bending stiffness) of the midsole 118 at any given location is at least partly dependent upon its height at that location. In the midsole 118, the relative inflation pressures are such that the peak height of the second sealed chamber 140 is substantially equal to the peak height of the stacked first and third sealed chambers 138, 141. This helps provide a relatively flat foot-facing outer surface 130 to enable a uniform feel of the midsole 118 against the foot. The height of the midsole 118 at any given location is dependent upon the width (right to left in FIGS. 3-6) of the chambers 138, 140, 141, as well as the overlap between the sealed chambers (i.e., portions where all three sealed chambers 138, 140, 141 are vertically stacked). These features are dependent upon the placement and width of the bonds 142. The bonds 142 can be shaped and positioned to provide areas of relatively decreased bending stiffness (and therefore increased flexibility) where desired.

Referring to FIG. 3, the first polymeric sheet 132 and the second polymeric sheet 134 are bonded to one another at a bond 147 along an outer peripheral portion 148 of an underside 150 of the second sealed chamber 140 such that the first sealed chamber 138 underlies the second sealed chamber 140 only inward of the outer peripheral portion 148 of the underside 150 of the second sealed chamber 140. Similarly, the third polymeric sheet 136 and the fourth polymeric sheet 137 are bonded to one another at a bond 151 along an outer peripheral portion 153 of a top side 155 of the second sealed chamber 140 such that the third sealed chamber 141 overlies the second sealed chamber 140 only inward of the outer peripheral portion 153 of the top side 155 of the second sealed chamber 140.

The bonds 147, 151 at the outer peripheral portions 148, 153 at both the underside 150 and the top side 155 create a double sheet thickness along the entire outer periphery 148, 153 of the midsole 118 both above and below the peripheral flange 146, which has a four-sheet thickness. The double-sheet thickness at outer peripheral portions 148, 153 lessens ballooning outward of the midsole 118 under the dynamic compressive load and helps to even the pressure within the second fluid chamber 140 under a dynamic compressive load.

The second polymeric sheet 134 is also bonded to the first polymeric sheet 132 at lower bonds 157 at a lower periphery of the second sealed chamber 140 at the ground-facing outer surface 128 of the midsole 118 and inward of the bonds 147 at the outer periphery. The third polymeric sheet 136 is bonded to the fourth polymeric sheet 137 at upper bonds 159 at an upper periphery of the third sealed chamber 141 at the foot-facing outer surface 130 of the midsole 118 and inward of the bonds 151. As is apparent in the cross-sectional view of FIG. 3, the second polymeric sheet 134 and the third polymeric sheet 136 tether the first polymeric sheet 132 to the fourth polymeric sheet 137 between the upper and lower bonds 157, 159, and between bonds 147, 151 and bonds 157, 159 via the bonds 142. Selection of the shape, size, and location of various webbing bonds 142, 147, 151, 157, 159 of a midsole, such as the midsole 118, enables a desired contoured outer surface of the finished midsole. Prior to bonding at the bonds 142, at the flange 146, and at the bond 147 discussed below, the polymeric sheets 132, 134, 136 and 137 are stacked, flat sheets. Anti-weld material may be ink-jet printed at all selected locations on the sheets where bonds are not desired. For example, the anti-weld material may be printed on both sides of the second and third polymeric sheets 134, 136 and/or on the upper surface of the first polymeric sheet 132, the upper surface of the second polymeric sheet 134, and the upper surface of the third polymeric sheet 136 in the four-sheet embodiment of the midsole 118. The stacked, flat polymeric sheets are then heat pressed to create bonds between adjacent sheets on all adjacent sheet surfaces except for where anti-weld material was applied. No radio frequency welding is necessary.

Prior to bonding, the polymeric sheets 132, 134, 136, 137 are stacked, flat sheets. Once bonded, the polymeric sheets 132, 134, 136, 137 remain flat, and take on the contoured shape only when the chambers 138, 140, 141 are inflated and then sealed. In the embodiment shown, the polymeric sheets 132, 134, 136, and 137 are not thermoformed. Accordingly, if the inflation gas is removed, and assuming other components are not disposed in the chambers and the polymeric sheets are not yet bonded to other components, such as the outsole 120, the polymeric sheets 132, 134, 136, and 137 will return to their initial, flat state.

The second sealed chamber 140 directly overlies only a first portion 161 of the first sealed chamber 138. The first portion 161 is that portion not directly underlying the bonds 142, and is best shown in FIG. 2 between the lines representing the bonds 142 and the lines representing the outer periphery 144 of each discrete first chamber 138. The areas bounded by the shape of each discrete first chamber 138 in FIG. 2 also represent where relatively thick portions 164 of the outsole 120 that have lugs 160, 162 are disposed. The third sealed chamber 141 directly overlies only a remaining portion 163 of the first sealed chamber 138. The remaining portion 163 is that portion directly under each of the various discrete bonds 142. These portions 161, 163 are also indicated in FIG. 3, with the first portion 161 outside of the vertical dashed lines 152 extending downward from the outer periphery 144 (see FIG. 2) of the respective bond 142 thereabove, and the remaining portion 163 inside of the dashed lines 152.

With this arrangement of the sealed chambers 138, 140, 141, the first cushioning layer 122 absorbs the dynamic compressive load in series with the second cushioning layer 124 and the third cushioning layer 126 at the first portion 161 of the first sealed chamber 138, and the first cushioning layer 122 absorbs the dynamic compressive load in parallel with the second cushioning layer 124 and in series with the third cushioning layer 126 at the remaining portion 163 of the first sealed chamber 138.

As described, the second cushioning layer 124 is disposed at least partially in series with the first cushioning layer 122 relative to the dynamic compressive load FL, GL applied on the midsole 118. More specifically, the first cushioning layer 122 and the second cushioning layer 124 are in series relative to the load FL, GL at the portions 161. The third cushioning layer 126 is also in series with the second cushioning layer 124 where the third cushioning layer 126 falls above the portions 161. Accordingly, all three cushioning layers 122, 124, 126 are in series at the portions 161. The third cushioning layer 126 is directly in series with the first cushioning layer 122 relative to the dynamic compressive load FL, GL at the portions 163.

An outsole 120 is secured to the ground-facing outer surface 128 of the midsole 118. In the embodiment, shown, the outsole 120 extends from the medial edge 121 (also referred to as medial extremity) to the lateral edge 123 (also referred to as lateral extremity) of the midsole 118 (i.e., from the flange 146 at the medial side to the flange 146 at the lateral side). The outsole 120 may extend as one piece under the entire midsole 118 from front to rear as well, or the outsole 120 may be multiple, discrete pieces. Relatively thick portions 164 of the outsole 120 that directly underlie the first sealed chamber 138 have lugs 160, 162. In the embodiment shown, relatively thin portions 165 of the outsole 120 directly underlying the second sealed chamber 140 do not have lugs. As used herein, "relatively thick" and "relatively thin" are used in comparison to one another, and do not denote any specific magnitudes of thickness. The thickness of the relatively thick portions 164 may include the thickness of the lugs 160 as well as the thickness of the base of the outsole from which the lugs 160, 162 protrude. Central lugs 160 are substantially centered under the first sealed chamber 138 at the rounded portions of the ground-facing outer surface 128 of the first polymeric sheet 132 and are in contact with the ground surface G even when the sole structure 112 is only under a steady state load or is unloaded.

The outsole 120 also includes one or more side lugs 162 that surround the central lugs 160 and are disposed closer to the second sealed chamber 140 of the domed ground-facing outer surface 128 and/or are shorter than the central lugs 160 such that they are not in contact with the ground surface G when the sole structure 112 is unloaded or is under only a steady state load or a dynamic compressive load not sufficiently large to cause compression of the first sealed chamber 138 to the first stage of compression I of FIG. 4. As is indicated in FIG. 3, the lower surfaces of the lugs 160, 162 generally follow the profile of the rounded shape of the ground-facing outer surface 128 under the first chamber 138. The lugs 160, 162 may be an integral portion of the outsole 120 as in the embodiment shown. In an alternative embodiment, either or both of the central lugs 160 and the side lugs 162 may be not integrally formed with the outsole 120, but instead may be secured to the outsole 120 so that the outsole 120 with the lugs 160, 162 functions as a unitary component.

Portions 165 of the outsole 120 that directly underlie the second sealed chamber 140 at the ground-facing outer surface 128 are not in contact with the ground surface G when the sole structure 112 is unloaded, or is under only a first load, such as a steady state load or a dynamic compressive load not sufficiently large to cause compression of the first sealed chamber 138 to the first stage of compression I of FIG. 4. Stated differently, the relatively thin portions 165 do not form part of the ground contact surface of the outsole 120 under the first load. Portions 165 may have no lugs, may have other tread elements, such as tread elements in a herringbone orientation, or may have a smooth surface with no tread design or lugs.

For each discrete pod of the first sealed chamber 138, the total width W3 of all of the central lugs 160 at the ground contact surface G is less than a width W4 of the ground-facing outer surface 128 of the first polymeric sheet 132 at the pod, as indicated with respect to one of the grouping of lugs 160, 162 in FIG. 3. Because the central lugs 160 rest on the ground surface G and are not as wide as the ground-facing outer surface 128 of the overlying corresponding portion of the first cushioning layer 122 disposed directly there above, the reaction load (ground load GL) of the dynamic compressive load on the midsole 118 is initially applied through the central lugs 160 toward a center of the domed outer surface 128 of the first polymeric sheet 132 where the maximum available displacement of the first sealed chamber 138 exists. Because the portions of the outsole 120 with lugs 160, 162 are not as wide as the portion of the ground-facing outer surface 128 where they are attached, the first sealed chamber 138 is compressed around the portions 164 with the lugs 160, 162. Moreover, the portions 164 are nested between portions of the higher pressure second sealed chamber 140, increasing the force required to move the midsole 118 laterally as the nested portions of the outsole 120 are held in place against the ground by the surrounding second sealed chamber 140. The midsole 118 and the outsole 120 are thus cooperatively configured to interact to increase traction and lateral stability during compression, such as during a lateral cutting motion in basketball. Stated differently, under a first compressive load, the ground-facing outer surface 128 of the midsole 118 is rounded under the first cushioning layer 122 such that the central lugs 160 are lower than the side lugs 162, and under a second compressive load greater than the first load, the first cushioning layer 122 compresses, moving the side lugs 162 level with the central lugs 160, thereby increasing ground contact area of the outsole 120. Therefore, under a first compressive load, such as a load of a stationary wearer within a range of expected body weights, only the relatively thick portions 164 (and more specifically, the lugs 160 thereof) form a ground contact surface, and under a second compressive load greater than the first compressive load, the first sealed chamber 138 compresses such that both the relatively thick portions 164 and the relatively thin portions 165 form the ground contact surface. Moreover, even the relatively thick portions 164 have a greater contact area with the ground surface under the greater second load, as the side lugs 162 now also form part of the ground contact surface. The thicker portions 164 of the outsole 120 under the first cushioning layer 122 protrude further from the midsole 118 than thinner portions 165 of the outsole 120 under the second cushioning layer 124 under the first compressive load.

The material of the outsole 120 in the embodiment shown has a fourth stiffness K4 that is greater than the first stiffness K1 of the first cushioning layer 122, and may be more or less stiff than either or both of the second stiffness K2 of the second cushioning layer 124 and the third stiffness K3 of the third cushioning layer 126. For example, the outsole 120 could be a polymeric foam, such as an injected foam. In the embodiment shown, the fourth stiffness K4 is greater than the first stiffness K1 and the third stiffness K3, and is less than the second stiffness K1.

With reference to FIGS. 3-6, the stages of absorption of the dynamic compressive load FL, GL represented by the footbed load FL and the reaction ground load GL is schematically depicted assuming that the first stiffness K1 of the first cushioning layer 122 is less than the second stiffness K2 of the second cushioning layer 124, and the third stiffness K3 is greater than the first stiffness K1 and less than the second stiffness K2. When the sole structure 112 initially receives the dynamic compressive load FL, GL, the least stiff, first cushioning layer 122 is the first to compress, both changing the shape of the first sealed chamber 138 and compressing the gas in the first sealed chamber 138 such that the overall volume of the first sealed chamber 138 is reduced in FIG. 4 (which represents the first stage of compression I) relative to the unloaded state shown in FIG. 3. Compression of the second sealed chamber 140, the third sealed chamber 141, and the outsole 120 in the first stage of compression I, if any, is minimal. In the first stage of compression I shown in FIG. 4, the compression of the first sealed chamber 138 straightens or inverts the rounded surface, causing the side lugs 162 to now form part of the ground contact surface over which the ground load GL is spread, increasing traction and stability. The relatively thin portions 165 of the outsole 120 directly underlying the second sealed chamber 140 are also in contact with the ground surface G and form part of the ground contact surface in the first stage of compression I. The ground contact surface of the sole structure 112 is thus larger in the first stage of compression I than in the unloaded state, increasing traction and stability of the outsole 120. The midsole 118 has an effective stiffness during the first stage of compression I that is dependent on the first stiffness K1 that is substantially linear, and may be represented by the portion 102 of a stiffness curve 100 of FIG. 7. The portion 102 of the curve 100 represents the absorption of the dynamic compressive load by the first cushioning layer 122 with the first stiffness K1.

Figure 5:
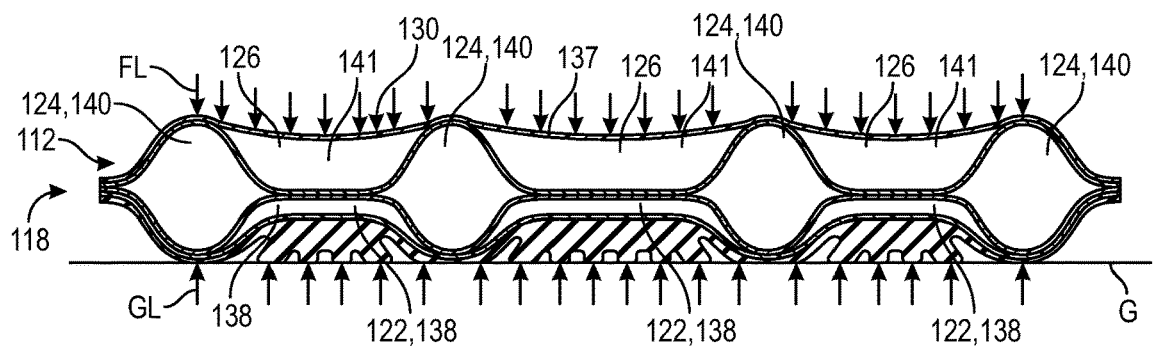
FIG. 5 is a schematic illustration in cross-sectional view of the sole structure of FIG. 3 in a second stage of compression.

In the second stage of compression II shown in FIG. 5, the third cushioning layer 126 begins compressing by compression of the gas in the third sealed chamber 141, as indicated by the smaller volume of the third sealed chamber 141. Compression of the first sealed chamber 138 of the first cushioning layer 122 may continue in series with compression of the third cushioning layer 126 in the second stage of compression II assuming that the first cushioning layer 122 has not reached its maximum compression under the dynamic compressive load. The midsole 118 has an effective stiffness during the second stage of compression II that is dependent on the third stiffness K3 and potentially to a lesser extent on the first stiffness K1, and is represented by the portion 104 of the stiffness curve 100 in FIG. 7. The portion 104 of the curve 100 represents the absorption of the dynamic compressive load by the third cushioning layer 126.

Figure 6:
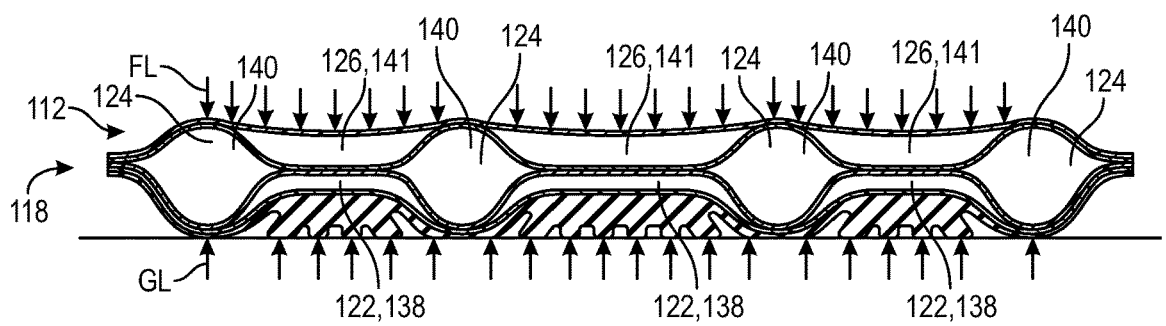
FIG. 6 is a schematic illustration in cross-sectional view of the sole structure of FIG. 3 in a third stage of compression.
Figure 7:
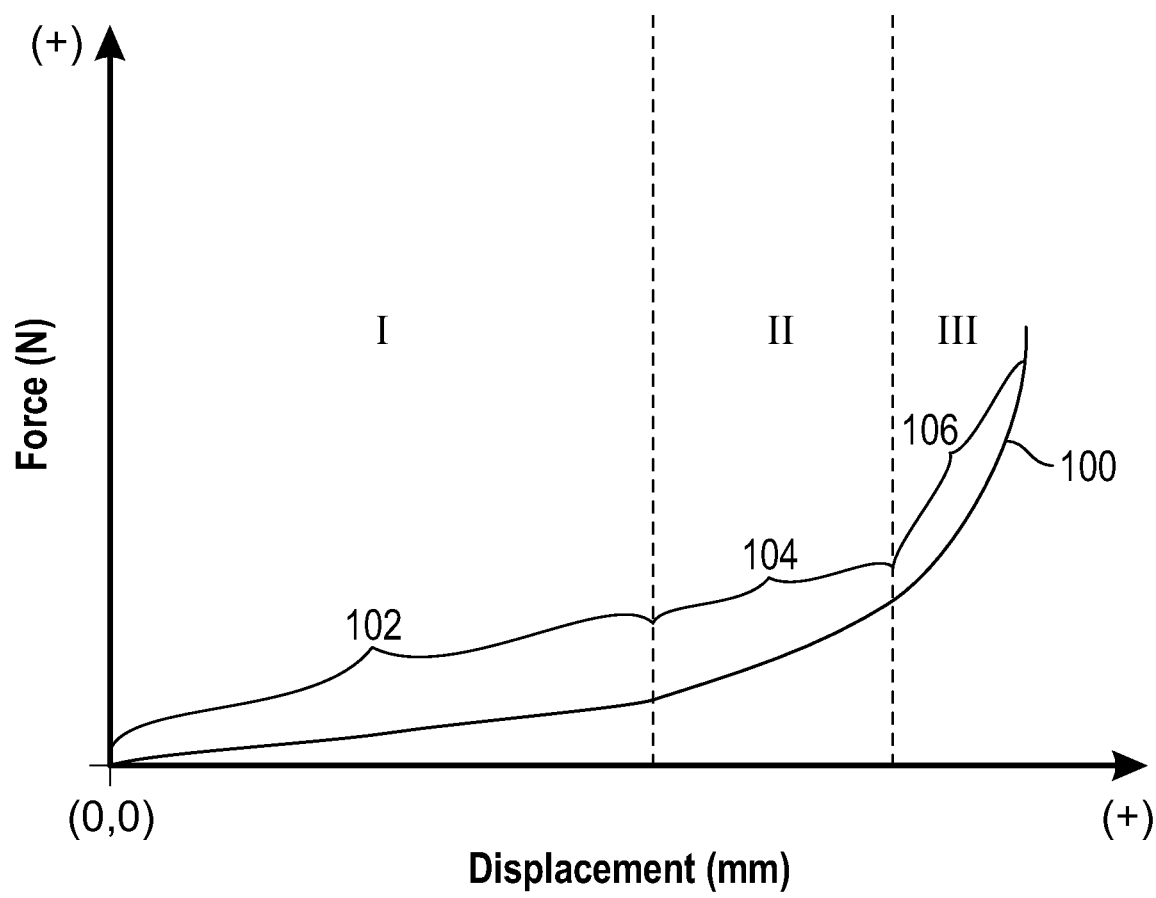
FIG. 7 is a plot of force versus displacement during dynamic compressive loading of the sole structure of FIGS. 4-6.

In the third stage of compression III shown in FIG. 6, the second cushioning layer 124 begins compressing by compression of the gas in the second sealed chamber 140, as indicated by the smaller volume of the second sealed chamber 140 in FIG. 6 than in FIG. 5. If compression of the first sealed chamber 138 has not yet reached its maximum compression, then compression of the first portion 161 of the first sealed chamber 138 will continue in series with the second cushioning layer 124, and compression of the remaining portion 163 will continue in parallel with the second cushioning layer 124. If compression of the third cushioning layer 126 has not already reached its maximum under the dynamic compressive load in the second stage of compression II, compression of a portion of the third sealed chamber 141 between the lines 152 above each webbing 142 will continue in parallel with compression of the second cushioning layer 124 and in series with compression of the first cushioning layer 122, assuming compression of the first cushioning layer 122 has not already reached its maximum under the dynamic compressive load. Compression of a portion of the third sealed chamber 141 outward of the lines 152 above each webbing 142 will continue in series with the second cushioning layer 124 and in series with compression of the first cushioning layer 122, assuming compression of the first cushioning layer 122 and the third cushioning layer 126 have not already reached their maximum under the dynamic compressive load.

The stiffness K4 of the outsole 120 can be selected such that compression of the outsole 120 will not begin until after the third stage of compression III. The third stage of compression III has an effective stiffness that corresponds mainly with the relatively stiff second cushioning layer 124. Sealed chambers of compressible gas tend to quickly ramp in compression in a nonlinear manner after an initial compression. The effective stiffness of the midsole 118 during the third stage of compression III is dependent upon the second stiffness K2, and potentially to a lesser extent on the first stiffness K1 and the third stiffness K3, and is represented by the portion 106 of the stiffness curve 100 in FIG. 7. The reduced overall height of the midsole 118 throughout the first, second, and third stages of compression as indicated in FIGS. 4-6 also reduces the tendency of tilting or tipping of the midsole 118.

Referring again to FIG. 2, it is evident that the bonds 142 between the second and third polymeric sheets 134, 136 are shaped, arranged, and positioned to provide torsional stability while allowing forefoot flexing in multiple directions. More specifically, in the forefoot region 113, the bonds 142 are disposed so that the second sealed chamber 140 forms multiple elongated segments, also referred to herein as tubular sub-chambers, extending transversely across the midsole 118 substantially from the medial edge 121 to the lateral edge 123. A central axis CL1 of a first elongated segment 140A of the second sealed chamber 140 extends substantially or completely from the medial edge 121 to the lateral edge 123 establishing a first flexion axis FL1 about which the midsole 118 flexes in the forefoot region 113. The bonds 142 are also disposed so that a central axis CL2 of a second elongated segment 140B of the second sealed chamber 140 extends substantially or completely from the medial edge 121 to the lateral edge 123 establishing a second flexion axis FL2 about which the midsole 118 flexes in the forefoot region 113. The second flexion axis FL2 extends forward from the medial edge 121 to the lateral edge 123. Both of the flexion axes FL1, FL2 are arranged at a respective acute angle A1, A2 measured from the portion of a longitudinal midline LM of the midsole 118 forward of a point P1 to the flexion axes FL1, FL2. The first flexion axis FL1 extends at an acute angle A1, and the second flexion axis FL2 extends at an acute angle A2. The acute angles A1 and A2 are 45 degrees in the embodiment shown. In other embodiments, the acute angles may range from 30 degrees to 60 degrees. The first and second elongated segments 140A, 140B and the flexion axes FL1, FL2 intersect at the point P1 along the longitudinal midline LM that serves as a pivot point. A plurality of V-shaped bonds border and define the elongated segments 140A, 140B (from above and at the lateral and medial sides). The first and second elongated segments 140A, 140B thus form an X shape in the forefoot region 113.

The relatively thin portions 165 of the outsole 120 that directly underlie the second sealed chamber 140 at the ground-facing outer surface 128, shown and described with respect to FIGS. 3-6, are disposed in the same pattern as the first and second elongated segments 140A, 140B. Additionally, the midsole 118 tends to flex with the flexion axes FL1, FL2 of the uninterrupted elongated segments 140A, 140B serving as pivot axes. When the forefoot region 113 of the midsole 118 (with the outsole 120 secured thereto) is planted on the ground G, a wearer can pivot either toward the lateral side (i.e., the side between the lateral edge 123 and the longitudinal midline LM) by flexing along the first flexion axis FL1, or toward the medial side (i.e., the side between the longitudinal midline LM and the medial edge 121) by flexing along flexion axis FL2, lifting the heel region 117 in either case.

A plurality of V-shaped bonds 142 in the heel region 117 border tubular sub-chambers 140C, 140D (that may also be referred to as first and second elongated members, respectively) with similarly angled flexion axes FL3 and FL4 arranged at acute angles A3, A4 within similar numerical ranges as angles A1 and A2. The flexion axes FL3 and FL4 extend from the medial edge 121 to the lateral edge and intersect at point P2.

Notably, in the midfoot region 115 of the midsole 118, the bonds 142 are disposed such that each of the first sealed chamber 138, the second sealed chamber 140, and the third sealed chamber 141 extends across the longitudinal midline LM of the midsole substantially from the lateral edge 123 of the midsole 118 to the medial edge 121 of the midsole, providing torsional rigidity in the midfoot region 115. The V-shaped bonds in the midfoot region 115 border an elongated segment 140E. The second chamber 140 extends from the medial edge 121 to the lateral edge 123 uninterrupted by the webbing 142 and stacked first and third chambers 138, 141. The symmetrical distribution of the webbing 142 relative to the longitudinal midline LM defines many elongated segments of the second sealed chamber 140 in the midfoot region 115 that extend nearly from the medial edge 121 to the lateral edge 123, providing torsional rigidity (i.e., support and torsional stability in the midfoot region 115). Stated differently, the midsole 118 discourages twisting of the midsole about the longitudinal midline LM in the midfoot region 115.

Moreover, many of the closed shapes of the bonds 142 in FIG. 2 extend substantially the width of the midsole 118 from the medial edge 121 to the lateral edge 123. The portions of the outsole 120 with lugs 160, 162 underlie the bonds 142 as indicated in FIG. 3, and are thus arranged to have a substantial and constant transverse footprint during all stages of loading, resisting lateral movement of the sole structure 112 when the sole structure 112 is planted on the ground with a lateral cut (i.e., with a laterally outward and downward force), such as in basketball.

Figure 9:
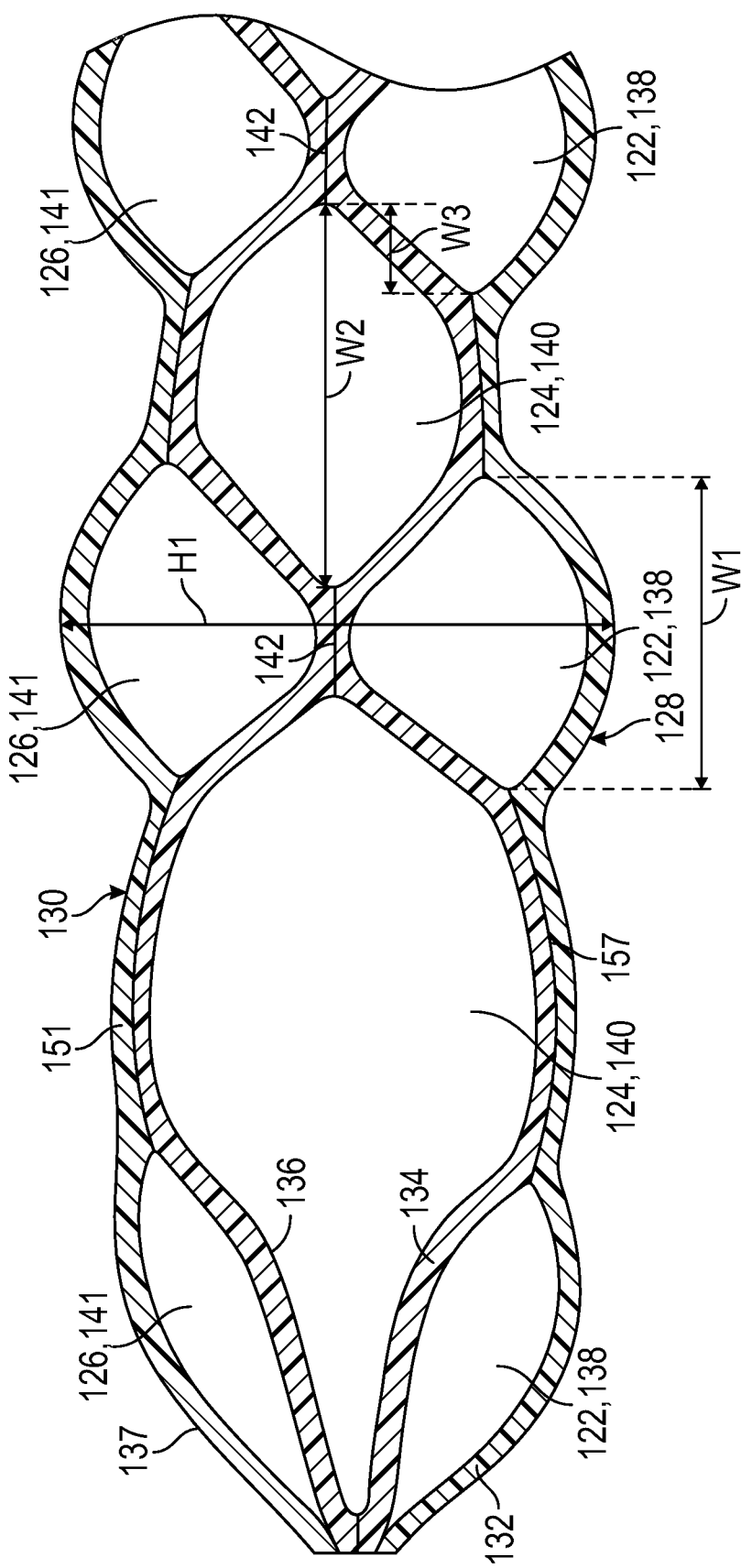
FIG. 9 is a schematic illustration in cross-sectional fragmentary view of the midsole of FIG. 8 taken at lines 9-9.

FIG. 8 shows another embodiment of a midsole 218 in plan view, showing the forefoot-facing surface 130. FIG. 8 is thus the opposite (top) surface of the midsole 218 than the bottom surface of midsole 118 shown in FIG. 2). FIG. 9 is a fragmentary cross-sectional view at the lines 9-9 in FIG. 8. The midsole 218 has many of the same features as midsole 118, and these are referred to with like reference numbers. Similar to midsole 118, the midsole 218 includes the four polymeric sheets 132, 134, 136, and 137. The anti-weld material is applied to the adjacent surfaces of the polymeric sheets 132, 134, 136, and 137 in a different pattern than in FIG. 2. Like midsole 118, the bonds 142 are disposed in the midsole 218 to establish the flexion axes FL1, FL2, FL3, and FL4. Moreover, the bonds 142 are disposed in the midfoot region 115 such that portions of each of the first sealed chamber 138, the second sealed chamber 140, and the third sealed chamber 141 extend across the longitudinal midline LM of the midsole 218 substantially from the lateral edge 123 to the medial edge 121 of the midsole 218, providing torsional rigidity in the midfoot region 115. The bonds 142 in the midfoot region 115 are arranged such that the second sealed chamber 140 includes elongated segments (also referred to as tubular sub-chambers) that extend substantially from the lateral edge 123 to the medial edge 121 providing torsional rigidity in the midfoot region 115.

FIG. 8 shows a first inflation port 145 that extends between the second and third polymeric sheets 134, 136 at the periphery prior to sealing of the peripheral flange 146. The inflation port 145 may be used to inflate the second sealed chamber 140, and then sealed and trimmed. A second inflation port 149 is shown that may extend between the third and fourth polymeric sheets 136, 137 and/or between the first and second polymeric sheets 132, 134 and be used to inflate either or both of the stacked first and third sealed chambers 138, 141, and then sealed and trimmed.

Referring to FIG. 9, the midsole 218 is shown in an unloaded state. The midsole 218 loads in a graded manner as described with respect to midsole 118. The outsole 120 of FIGS. 1 and 3-6 is not shown in FIG. 9, but is secured to the ground-facing outer surface 128 in the same manner as in FIG. 3. Except at the outermost periphery, where the middle, second and third polymeric sheets 134, 136 tether the first and fourth polymeric sheets 132, 137 to one another, the midsole 218 has a height H1 at the stacked first and third sealed chambers 138, 141. The height H1 is determined by selecting the width of the bonds 142 and bonds 151, 157, which in turn determines the width W1 of the first and third sealed chambers 138, 141 and the width W2 of the second chamber 140. In a non-limiting example, height H1 may be 14 mm if width W1 is 10 mm, width W2 is 11 mm, and width W3 is 3.5 mm. In another example, height H1 may be 19 mm if width W1 is 12 mm, width W2 is 13 mm, and width W3 is 4.5 mm.

In one non-limiting example, the various embodiments of midsoles disclosed herein may provide peak loads in Newtons from about 110 N to about 320 N, where peak load is defined as 75 percent displacement in average height of the midsole. Compressive stiffness can be evaluated using ASTM F1614-99(2006), or ASTM F1976, Standard Test Method for Impact Attenuation of Athletic Shoe Cushioning Systems and Materials, or other test methods may be used.

In one non-limiting example, the various embodiments of midsoles disclosed herein may provide energy return from about 59% to about 82%, when energy return is measured as the percent restoration of initial drop height of an impact tester, or is measured with a mechanical tester such as an INSTRON® tester available from Instron Corporation, Norwood Mass.

To assist and clarify the description of various embodiments, various terms are defined herein. Unless otherwise indicated, the following definitions apply throughout this specification (including the claims). Additionally, all references referred to are incorporated herein in their entirety.

An "article of footwear", a "footwear article of manufacture", and "footwear" may be considered to be both a machine and a manufacture. Assembled, ready to wear footwear articles (e.g., shoes, sandals, boots, etc.), as well as discrete components of footwear articles (such as a midsole, an outsole, an upper component, etc.) prior to final assembly into ready to wear footwear articles, are considered and alternatively referred to herein in either the singular or plural as "article(s) of footwear" or "footwear".

"A", "an", "the", "at least one", and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. As used in the description and the accompanying claims, unless stated otherwise, a value is considered to be "approximately" equal to a stated value if it is neither more than 5 percent greater than nor more than 5 percent less than the stated value. In addition, a disclosure of a range is to be understood as specifically disclosing all values and further divided ranges within the range.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

For consistency and convenience, directional adjectives may be employed throughout this detailed description corresponding to the illustrated embodiments. Those having ordinary skill in the art will recognize that terms such as "above", "below", "upward", "downward", "top", "bottom", etc., may be used descriptively relative to the figures, without representing limitations on the scope of the invention, as defined by the claims.

The term "longitudinal" refers to a direction extending a length of a component. For example, a longitudinal direction of an article of footwear extends between a forefoot region and a heel region of the article of footwear. The term "forward" or "anterior" is used to refer to the general direction from a heel region toward a forefoot region, and the term "rearward" or "posterior" is used to refer to the opposite direction, i.e., the direction from the forefoot region toward the heel region. In some cases, a component may be identified with a longitudinal axis as well as a forward and rearward longitudinal direction along that axis. The longitudinal direction or axis may also be referred to as an anterior-posterior direction or axis.

The term "transverse" refers to a direction extending a width of a component. For example, a transverse direction of an article of footwear extends between a lateral side and a medial side of the article of footwear. The transverse direction or axis may also be referred to as a lateral direction or axis or a mediolateral direction or axis.

The term "vertical" refers to a direction generally perpendicular to both the lateral and longitudinal directions. For example, in cases where a sole structure is planted flat on a ground surface, the vertical direction may extend from the ground surface upward. It will be understood that each of these directional adjectives may be applied to individual components of a sole structure. The term "upward" or "upwards" refers to the vertical direction pointing towards a top of the component, which may include an instep, a fastening region and/or a throat of an upper. The term "downward" or "downwards" refers to the vertical direction pointing opposite the upwards direction, toward the bottom of a component and may generally point towards the bottom of a sole structure of an article of footwear.

The "interior" of an article of footwear, such as a shoe, refers to portions at the space that is occupied by a wearer's foot when the article of footwear is worn. The "inner side" of a component refers to the side or surface of the component that is (or will be) oriented toward the interior of the component or article of footwear in an assembled article of footwear. The "outer side" or "exterior" of a component refers to the side or surface of the component that is (or will be) oriented away from the interior of the article of footwear in an assembled article of footwear. In some cases, other components may be between the inner side of a component and the interior in the assembled article of footwear. Similarly, other components may be between an outer side of a component and the space external to the assembled article of footwear. Further, the terms "inward" and "inwardly" refer to the direction toward the interior of the component or article of footwear, such as a shoe, and the terms "outward" and "outwardly" refer to the direction toward the exterior of the component or article of footwear, such as the shoe. In addition, the term "proximal" refers to a direction that is nearer a center of a footwear component, or is closer toward a foot when the foot is inserted in the article of footwear as it is worn by a user. Likewise, the term "distal" refers to a relative position that is further away from a center of the footwear component or is further from a foot when the foot is inserted in the article of footwear as it is worn by a user. Thus, the terms proximal and distal may be understood to provide generally opposing terms to describe relative spatial positions.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

While several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A sole structure for an article of footwear comprising:
    a midsole having four stacked polymeric sheets bonded to one another at a peripheral flange and defining a first cushioning layer having a first sealed chamber, a second cushioning layer having a second sealed chamber, and a third cushioning layer having a third sealed chamber, each sealed chamber retaining gas in isolation from each other sealed chamber;
    wherein bonds between adjacent ones of the four stacked polymeric sheets are arranged such that the third cushioning layer is stacked above the first cushioning layer with the second cushioning layer bordering both the first cushioning layer and the third cushioning layer, and the second sealed chamber of the second cushioning layer bordering the peripheral flange;
    wherein the peripheral flange extends along and establishes a periphery of the midsole at both a medial side of the midsole and a lateral side of the midsole from a forefoot region of the midsole to a heel region of the midsole;
    wherein the second sealed chamber borders the peripheral flange along the medial side and along the lateral side; and
    wherein the first cushioning layer has a first stiffness, the second cushioning layer has a second stiffness greater than the first stiffness, and the third cushioning layer has a third stiffness less than the second stiffness.

2. The sole structure of claim 1, wherein the second sealed chamber is a single chamber.

3. The sole structure of claim 1, wherein the second sealed chamber borders the peripheral flange along the medial side of the midsole from the forefoot region to the heel region and along the lateral side of the midsole from the forefoot region to the heel region.

4. The sole structure of claim 1, wherein the four stacked polymeric sheets include a first polymeric sheet, a second polymeric sheet, a third polymeric sheet, and a fourth polymeric sheet, the first sealed chamber bounded by the first polymeric sheet and the second polymeric sheet, the second sealed chamber bounded by the second polymeric sheet and the third polymeric sheet, and the third sealed chamber bounded by the third polymeric sheet and the fourth polymeric sheet; and
    wherein the first polymeric sheet and the second polymeric sheet are bonded to one another at a bond along an outer peripheral portion of an underside of the second sealed chamber such that the first sealed chamber underlies the second sealed chamber only inward of the outer peripheral portion of the underside of the second sealed chamber.

5. The sole structure of claim 4, wherein the third polymeric sheet and the fourth polymeric sheet are bonded to one another at a bond along an outer peripheral portion of a top side of the second sealed chamber such that the third sealed chamber overlies the second sealed chamber only inward of the outer peripheral portion of the top side of the second sealed chamber.

6. The sole structure of claim 5, wherein the bond along the outer peripheral portion of the underside of the second sealed chamber and the bond along the outer peripheral portion of the top side of the second sealed chamber have a double-sheet thickness.

7. The sole structure of claim 6, wherein the peripheral flange is outward of the outer peripheral portion of the top side of the second sealed chamber and outward of the outer peripheral portion of the underside of the second sealed chamber.

8. The sole structure of claim 1, wherein the first sealed chamber and the second sealed chamber are disposed adjacent to a ground-facing outer surface of the midsole; and
 wherein the first sealed chamber includes discrete sub-chambers not in fluid communication with one another.

9. The sole structure of claim 8, wherein the second sealed chamber is a single chamber that surrounds all of the discrete sub-chambers of the first sealed chamber.

10. The sole structure of claim 1, wherein the first cushioning layer and the second cushioning layer are disposed adjacent to a ground-facing surface of the midsole; and
 wherein the third cushioning layer is displaced from the ground-facing surface of the midsole by the first cushioning layer and the second cushioning layer.

11. The sole structure of claim 10, wherein the second cushioning layer and the third cushioning layer define a foot-facing surface of the midsole; and
 wherein the first cushioning layer is displaced from the foot-facing surface of the midsole by the second cushioning layer and the third cushioning layer.

12. The sole structure of claim 1, wherein the second sealed chamber includes a plurality of tubular sub-chambers in fluid communication with one another and each extending transversely across the midsole from the medial side of the midsole to the lateral side of the midsole.

13. The sole structure of claim 12, wherein the first sealed chamber and the second sealed chamber are disposed adjacent to a ground-facing outer surface of the midsole; and
 wherein the first sealed chamber includes a plurality of tubular sub-chambers.

14. The sole structure of claim 1, wherein the first cushioning layer and the second cushioning layer are adjacent to a ground-facing surface of the midsole, and further comprising:
 an outsole secured to the ground-facing surface; and
 wherein the outsole is thicker under the first cushioning layer than under the second cushioning layer.

15. The sole structure of claim 1, wherein the second cushioning layer directly overlies only a first portion of the first cushioning layer; and
 wherein the third cushioning layer directly overlies only a remaining portion of the first cushioning layer such that the first cushioning layer absorbs a dynamic compressive load in series with the second cushioning layer at the first portion of the first cushioning layer, and the first cushioning layer absorbs a compressive load in parallel with the second cushioning layer and in series with the third cushioning layer at the remaining portion of the first cushioning layer.

16. The sole structure of claim 1, wherein the four stacked polymeric sheets include a first polymeric sheet, a second polymeric sheet, a third polymeric sheet, and a fourth polymeric sheet, the four stacked polymeric sheets bonded to one another to define the first sealed chamber bounded by the first polymeric sheet and the second polymeric sheet, the second sealed chamber bounded by the second polymeric sheet and the third polymeric sheet, and the third sealed chamber bounded by the third polymeric sheet and the fourth polymeric sheet; and
 wherein the second polymeric sheet and the third polymeric sheet are bonded to one another between the first sealed chamber and the third sealed chamber at bonds at least some of which have an outer periphery with a closed shape and with the second sealed chamber bordering the outer periphery.

* * * * *